No. 861,623. PATENTED JULY 30, 1907.
W. H. TRABUE.
WHEEL.
APPLICATION FILED OCT. 25, 1906.
2 SHEETS—SHEET 1.
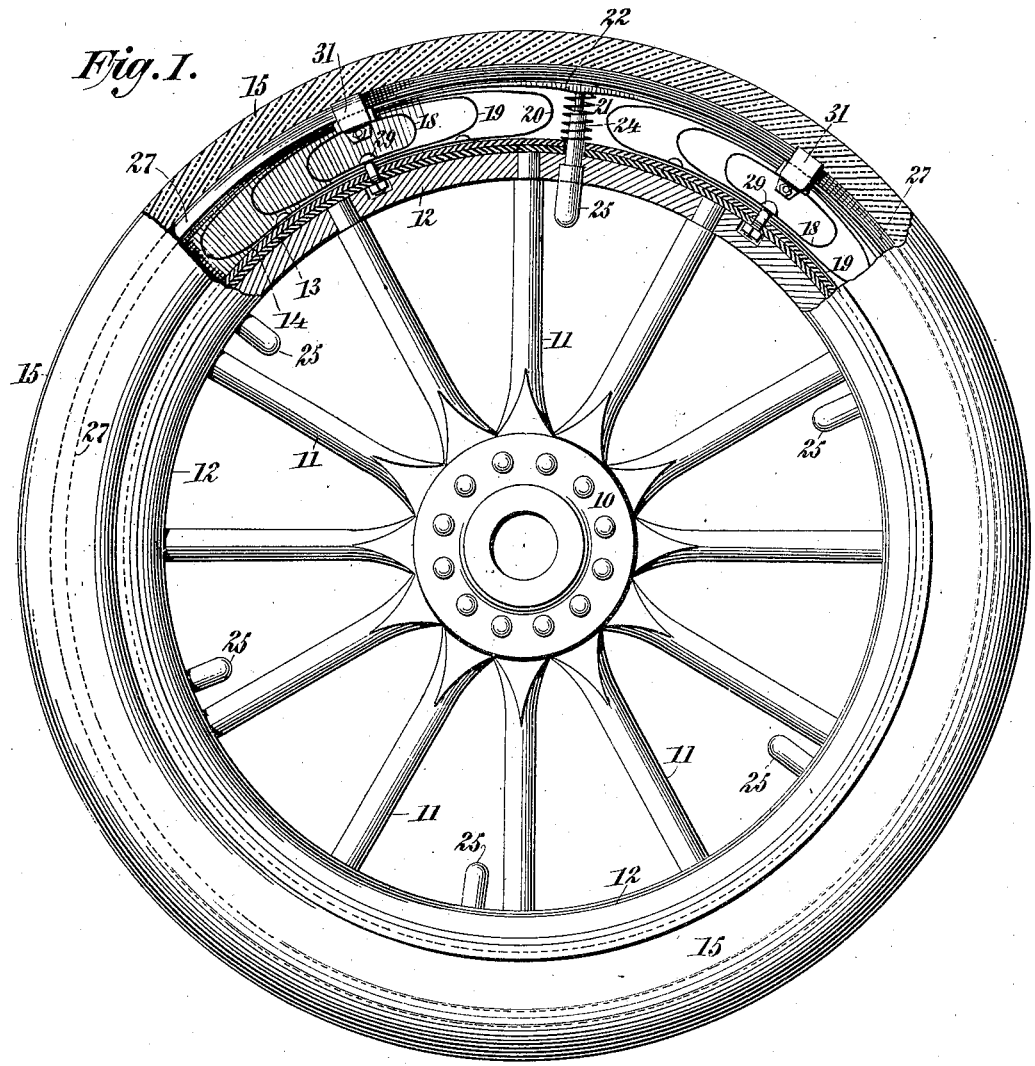
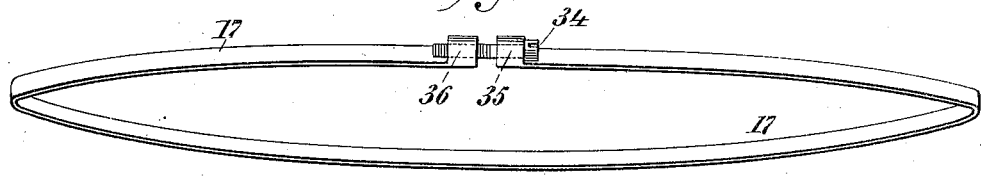
WITNESSES:
Gustave Dieterich
Edwin H. Dieterich
INVENTOR
William H. Trabue
BY Chas. O. Gill
ATTORNEY No. 861,623. PATENTED JULY 30, 1907.
W. H. TRABUE.
WHEEL.
APPLICATION FILED OCT. 25, 1906.
2 SHEETS—SHEET 2.
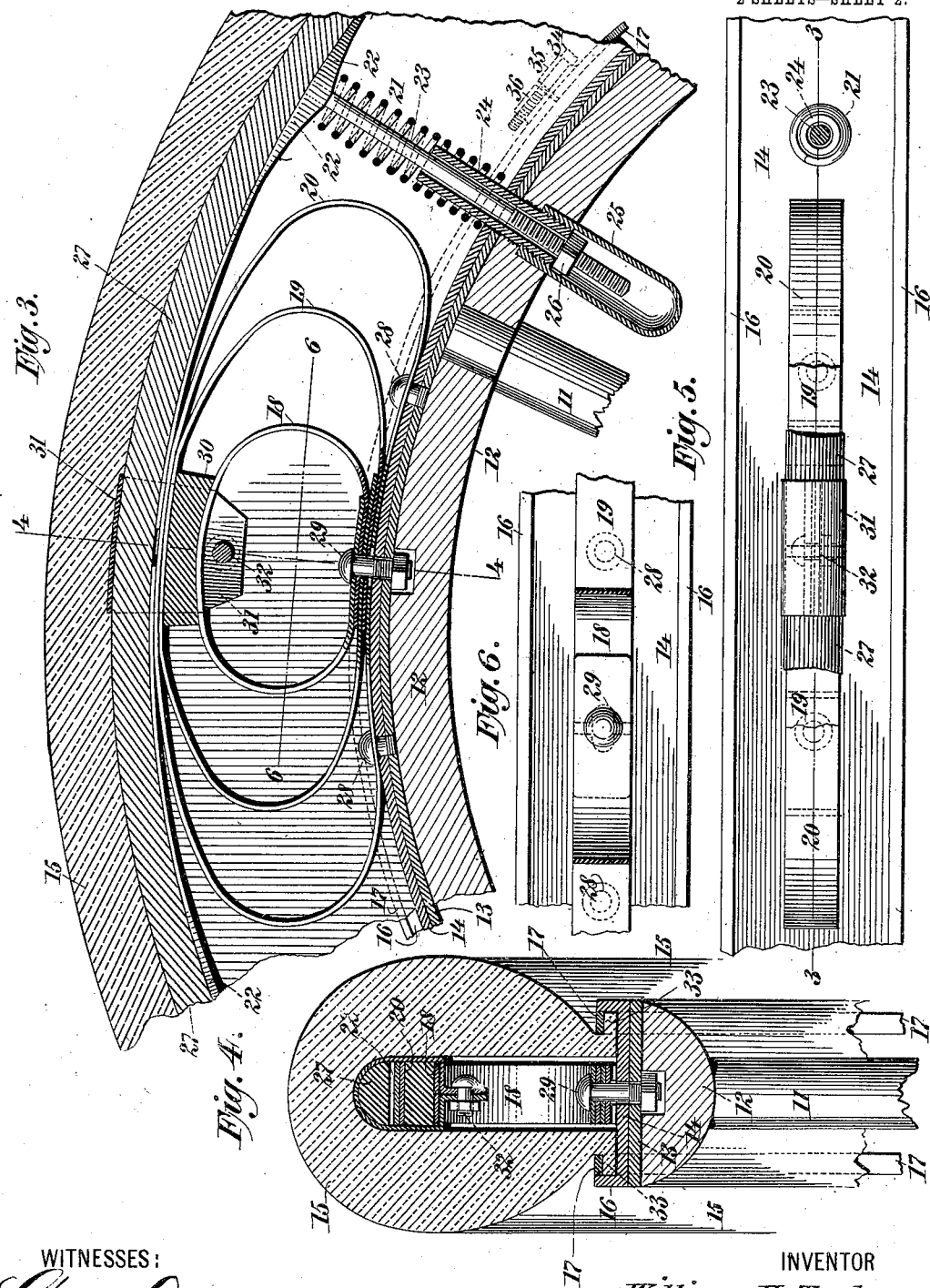
WITNESSES:
Gustave Dieterich
Edwin H. Dieterich
INVENTOR
William H. Trabue
BY Chas. C. Gill
ATTORNEY

UNITED STATES PATENT OFFICE.

WILLIAM H. TRABUE, OF MONTVALE, NEW JERSEY.

WHEEL.

No. 861,623.   Specification of Letters Patent.   Patented July 30, 1907.

Application filed October 25, 1906. Serial No. 340,496.

*To all whom it may concern:*

Be it known that I, WILLIAM H. TRABUE, a citizen of the United States, and a resident of Montvale, in the county of Bergen and State of New Jersey, have invented certain new and useful Improvements in Wheels for Automobiles and other Vehicles, of which the following is a specification.

The invention relates to improvements in wheels for automobiles and other vehicles, and it consists in the novel features, arrangements and combinations of parts hereinafter described, and particularly pointed out in the claims.

The object of my invention is to produce a wheel having an efficient and durable spring-cushion tire, whereby the occupants of a vehicle equipped with the wheels may be relieved from shock or jar and the difficulties incident to the employment of pneumatic tires avoided.

In carrying out my invention I apply upon the felly of the wheel suitable rims adapted to receive the spring cushioning means and also a rubber tire or shoe inclosing the same, the wheels being thus enabled to roll on rubber tires and the springs properly inclosed.

I provide a novel construction and arrangement of the springs and their co-acting parts and also a novel construction of outer shoe or tire to inclose the same, and my invention will be fully understood from the detailed description hereinafter presented, reference being had to the accompanying drawings, in which:

Figure 1 is a side elevation, partly in section, of a wheel constructed in accordance with and embodying the invention; Fig. 2 is a detached perspective view of one of the bands for securing the outer shoe or rubber tire upon the wheel; Fig. 3 is an enlarged detached central vertical section through a portion of the wheel embodying my invention; Fig. 4 is a vertical transverse section of the same on the dotted line 4—4 of Fig. 3; Fig. 5 is a top view, partly broken away, of a portion of the spring-cushioning devices, the outer shoe or tire being omitted, and Fig. 6 is a detached horizontal section through a portion of the spring cushioning devices on the dotted line 6—6 of Fig. 3.

In the drawings I illustrate a wheel comprising a hub 10, spokes 11 and felly 12, these features being of any usual or suitable form and construction, and upon the felly 12 are applied the metal rims or bands 13, 14 which carry all of the features constituting my invention, these being the spring cushioning devices and the outer rubber shoe or tire 15, whose outline is clearly represented in Fig. 4.

The band 13 is a plain metallic strip encircling the felly 12 and co-extensive in width therewith, and upon the band 13 is closely applied the rim 14, which, as illustrated in Fig. 4, is formed at its edges with outwardly extending flanges 16 adapted to confine the inner edges of the rubber shoe or tire 15 and also the clamping bands 17, as hereinafter explained.

At equi-distant points around the wheel I apply upon the bands 13, 14, sets of leaf springs, each set being shown as comprising springs 18, 19, 20, and between these sets of leaf springs I apply coiled springs 21 and steel bridging-plates 22, each of the latter having a central bearing upon one of the coiled springs and at its ends resting upon the two sets of leaf springs between which it may be placed. The bridging plates 22 are preferably of spring steel and centrally secured upon the outer ends of rods 23 which extend radially toward the center of the wheel and pass through guiding sleeves 24 which extend within the springs 21 and are secured by threads in the bands 13, 14, the latter being apertured to receive said sleeves. The sleeves 24 also extend through the felly 12 and upon their outer ends are applied hollow caps 25 within which the rods 23, may have a yielding or sliding movement.

Upon the rods 23 within the caps 25 are threaded nuts 26, which contact with the inner ends of the sleeves 24 and prevent undue outward movement of the springs 21 and bridging plates 22. The springs 21 are confined between the bridge-plates 22 and rim 14 and are always under tension, and by the adjustment of the rods 23 by means of the nuts 26, the said plates 22 may be given a correct initial position and secured against outward movement beyond such position. The bridging plates 22 are each on the arc of a circle and said plates at their facing ends are slightly separated from one other, as denoted in Fig. 3, so that upon the compression of the tire during use the said ends may not strike each other. The bridging plates 22 are each curved on the arc of a circle and form in effect a sectional metallic rim encircling the wheel, each section being independently mounted and capable of independent yielding movement, and it is between this sectional rim and the rim 14 that the leaf springs 18, 19, 20 are located, as may be seen in Fig. 3. Upon the outer face of the sectional rim formed by the bridging plates 22 is applied a band 27 of rubber, this band being co-extensive in width with the plates 22 and convex on its outer periphery, as shown in Fig. 4. The rubber band 27 encircles the entire wheel and closely fits upon the sectional rim formed by the alined curved bridging plates 22.

The leaf springs 18, 19, 20 are preferably oval or elongated in outline and are arranged, at each set, one within another. The outer spring 20 is secured to the rims 13, 14 by means of screws 28 and at its inner face presses against the rim 14, while at its outer face said spring impinges against the adjoining portions of two of the bridging plates 22 and furnishes a yielding metallic seat upon which said ends of said plates may bear. The ends of the strip of steel forming the spring 19 overlap each other and are secured by means of the bolt 29, which also secures the overlapping ends of the strip of steel forming the inner spring 18, and said bolt passes through the rims 13, 14, as shown. The outer face of the spring 19 bears against the central outer portion of the spring 20, while the outer face of the inner spring 18 bears against a block of rubber 30 which is interposed between the springs 19 and 18 and is held by means of a clip-plate 31 which encompasses, transversely, the rubber band 27, adjoining ends of the bridging plates 22, springs 20, 19, rubber block 30 and spring 18, as shown in Figs. 3 and 4, the ends of said plate 31 being brought together within the outline of the spring 18 and secured by means of a suitable bolt and nut 32. The spring feature of my tire thus comprises the leaf springs, preferably in sets, arranged at equi-distant points around the wheel, and the coiled springs disposed between the sets of leaf springs and cooperating with the bridge-plates 22, which bridge the spaces between and at their ends are seated upon the leaf springs and form in effect a sectional outer rim, each section bearing centrally upon a coiled spring and at its ends upon leaf springs. Upon the sectional rim formed of the bridging plates 22 is applied the rubber band 27, as hereinbefore explained.

Upon the spring construction hereinbefore described is applied the outer shoe or tire 15, which is a solid tire, with the exception that it is formed with a narrow chamber adapting it to pass snugly upon the rubber band 27 and the features intermediate between said band and the rim 14, the sides of the shoe 15 being full and convex and solid as shown in Fig. 4. At its inner edges the shoe 15 is formed with the laterally extending integral flanges 33 which fit within the flanges 16 of the rim 14, as shown in Fig. 4, and are bound within the rim 14 by means of metallic bands 17, one of which is shown in perspective in Fig. 2, these bands 17 extending circumferentially entirely around the flanges 33 and each being adapted to be drawn tightly against its flange 33 by means of a screw 34 which passes through ears 35, 36 formed at the ends of the band 17, the ear 36 having a threaded interior to receive the thread of said screw. The shoe 15 is thus as nearly solid as the presence of the spring features will permit and hence said shoe will co-act with said spring features in affording a durable and proper cushion-tire for the wheel.

My invention is not limited to all of the details of construction hereinbefore described, nor to the employment of three leaf springs in each set of springs, nor to said leaf springs being technically oval in outline, since I am aware that said springs may be varied in their configuration without modifying their function or detracting from their utility.

What I claim as my invention and desire to secure by Letters-Patent, is:

1. A wheel having secured upon its periphery a spring-cushion comprising a series of bridging plates constituting a sectional rim, coiled bearing springs for the middle portions of said plates, leaf springs affording seats for the adjacent ends of said plates, and a band upon the periphery of said sectional rim, combined with an outer rubber shoe inclosing said spring features; substantially as set forth.

2. A wheel having secured upon its periphery a spring-cushion comprising a series of bridging plates constituting a sectional rim, coiled bearing springs for the middle portions of said plates, leaf springs affording seats for the adjacent ends of said plates, and a band upon the periphery of said sectional rim, combined with an outer rubber shoe inclosing said spring features and having full convex sides and being solid with the exception of a narrow chamber formed therein to enable the shoe to receive said spring features; substantially as set forth.

3. A wheel having secured upon its periphery a spring-cushion comprising a series of bridging plates constituting a sectional rim, coiled bearing springs for the middle portions of said plates, leaf springs affording seats for the adjacent ends of said plates, and a band upon the periphery of said sectional rim, said band being of rubber and having a convex outer surface, combined with an outer rubber shoe inclosing said spring features and fitting against said band; substantially as set forth.

4. A wheel having secured upon its periphery a spring-cushion comprising a series of bridging plates constituting a sectional rim, coiled bearing springs for the middle portions of said plates, rods connected with said plates and extending through said springs and through the felly of the wheel, nuts upon said rods for controlling the initial position of said plates, leaf springs affording seats for the adjacent ends of said plates, and an outer circumferential covering for said sectional rim; substantially as set forth.

5. A wheel having secured upon its periphery a spring-cushion comprising a series of bridging plates constituting a sectional rim, coiled bearing springs for the middle portions of said plates, rods connected with said plates and extending through said springs and through the felly of the wheel, nuts upon said rods for controlling the initial position of said plates, leaf springs affording seats for the adjacent ends of said plates, and an outer circumferential covering for said sectional rim, combined with an outer rubber shoe inclosing said spring features and having full convex sides and being solid with the exception of a narrow chamber formed therein to enable the shoe to receive said spring features; substantially as set forth.

6. A wheel having secured upon its periphery a spring-cushion comprising a series of bridging plates constituting a sectional rim, coiled bearing springs for the middle portions of said plates, rods connected with said plates and extending through said springs and through the felly of the wheel, sleeves encompassing the inner ends of said rods within said springs and extending through said felly, nuts upon said rods for controlling the initial position of said plates and finding a bearing against the adjacent ends of said sleeves, caps upon said sleeves to inclose said nuts and the inner ends of said rods, springs affording seats for the end portions of said plates, and an outer circumferential covering for said sectional rim; substantially as set forth.

7. A wheel having secured upon its periphery a spring-cushion comprising a series of bridging plates constituting a sectional rim, coiled bearing springs for the middle portions of said plates, leaf springs affording seats for the adjacent ends of said plates and being arranged in sets one within the other, a band upon the periphery of said sectional rim, and clip-plates extending transversely over said band, the adjacent ends of said bridging plates and the outer portion of said leaf springs; substantially as set forth.

8. A wheel having secured upon its periphery a spring-cushion comprising a series of bridging plates constituting a sectional rim, coiled bearing springs for the middle portions of said plates, leaf springs affording seats for the adjacent ends of said plates and being arranged in sets one within the other with a rubber block between their outer portions, a band upon the periphery of said sectional rim, and clip-plates extending transversely over said band, the adjacent ends of said bridging plates, said block and the outer portion of said leaf springs; substantially as set forth.

9. A wheel having secured upon its periphery a metal rim having outwardly extending edge flanges, and a spring-cushion upon said rim and comprising a series of bridging plates constituting a sectional rim, bearing springs intermediate between the middle portions of said plates and said rim, and bearing springs intermediate between the end portions of said plates and said rim, combined with an outer rubber shoe inclosing said spring features and having lateral flanges at its inner edges set within the flanges of said metal rim, and securing bands extending around the wheel and binding against the said lateral flanges of said shoe; substantially as set forth.

Signed at New York city, in the county of New York and State of New York this 24th day of October A. D. 1906.

WILLIAM H. TRABUE.

Witnesses:
CHAS. C. GILL,
ARTHUR MARION.